United States Patent

Komiya et al.

[11] Patent Number: 5,897,678
[45] Date of Patent: Apr. 27, 1999

[54] PRODUCTION METHOD FOR LEAD-FREE CRYSTAL GLASS COMPOSITION

[75] Inventors: Hidetoshi Komiya, Tokyo; Shizue Inaba, Kanagawa, both of Japan

[73] Assignee: Toyo Glass Company Limited, Tokyo, Japan

[21] Appl. No.: 08/899,154

[22] Filed: Jul. 23, 1997

[30] Foreign Application Priority Data

Jun. 7, 1996 [JP] Japan ................................. 8-145919

[51] Int. Cl.$^6$ ............................. C03B 5/16; C03B 5/18; C03B 5/225

[52] U.S. Cl. ..................... 65/134.1; 65/134.3; 501/65; 501/70; 501/72; 501/903

[58] Field of Search ................... 501/65, 70, 72, 501/903; 65/134.1, 134.3

[56] References Cited

U.S. PATENT DOCUMENTS

| | | | |
|---|---|---|---|
| 3,970,463 | 7/1976 | Planchock et al. | 106/39.7 |
| 4,877,768 | 10/1989 | Ziolo | 505/1 |
| 5,213,440 | 5/1993 | Yeh et al. | 65/134.3 |
| 5,376,597 | 12/1994 | Ogata et al. | 501/72 |
| 5,466,285 | 11/1995 | Kamiya et al. | 106/35 |
| 5,468,693 | 11/1995 | Comte | 501/72 |

FOREIGN PATENT DOCUMENTS 6-183774  7/1994  Japan .............................. C03C 3/078

*Primary Examiner*—Peter Chin
*Assistant Examiner*—Jacqueline A. Ruller
*Attorney, Agent, or Firm*—Sughrue, Mion, Zinn, Macpeak & Seas, PLLC

[57] ABSTRACT

The invention provides a method by which a crystal glass composition which employs $TiO_2$ as a raw material substituted for PbO can be produced while effectively preventing development of a yellowish color of the glass composition which is caused by $TiO_2$. In the production method, to a batch composition which is composed of 50 to 60 percent by weight of $SiO_2$, 4 to 14 percent by weight of $K_2O$, 10 to 20 percent by weight of BaO and 3 to 10 percent by weight of $TiO_2$, $NaNO_3$ (sodium nitrate) is added by 1.0 to 5.0 percent by weight or $BaO_2$ (barium peroxide) is added by 0.3 to 2.0 percent by weight for elimination of development of a color which arises from the 3 to 10 percent by weight of $TiO_2$, and also one of $Sb_2O_3$ (antimony oxide) and $As_2O_3$ (arsenious acid) is added by 0.2 to 1.0 percent by weight for defoaming. Instead, $NaSb(OH)_6$ (sodium antimonate) having color development elimination and defoaming actions may be added by 0.5 to 2.0 percent by weight.

4 Claims, 1 Drawing Sheet

PRODUCTION METHOD FOR LEAD-FREE CRYSTAL GLASS COMPOSITION

BACKGROUND OF THE INVENTION

1. Field of the Invention

This invention relates to a production method for a crystal glass composition which looks like or can be regarded as crystal glass although it does not contain lead (Pb).

2. Description of the Related Art

Conventionally, lead-containing crystal glass is used popularly as crystal glass for use to produce tableware or like articles. The characteristics of it, in short, such characteristics that "it is massive", that "it has a high light refractive index and exhibits a high dispersion value of light" and that "it melts readily", are provided principally by PbO. While the content of PbO varies widely, it generally ranges from 24 to 26 percent by weight.

Since lead-containing crystal glass contains much lead having a high toxicity in this manner, where it is used for tableware, injuries to the human bodies are apprehended. Thus, the regulations to the content of PbO tend to become further severe.

Therefore, the assignee of the present invention has proposed, in Japanese Patent Laid-Open Application No. Heisei 6-183774, a glass composition which does not contain lead at all but has characteristics equivalent to those of lead-containing crystal glass. The glass composition consists of $SiO_2$, $TiO_2$ for assuring a high light refractive index and a high dispersion, BaO for assuring a high density and a high refractive index, $K_2O$ for suppressing development of a color by Fe ions and $Na_2O$ for decreasing the melting temperature as principal components.

However, since the glass composition employs $TiO_2$ (titanium oxide) as a raw material substituted for PbO, the glass has a tendency to be colored yellowish due to coexistence of $TiO_2$ with an impurity originating from the raw material.

SUMMARY OF THE INVENTION

It is an object of the present invention to provide a method by which a crystal glass composition which employs $TiO_2$ as a raw material substituted for PbO can be produced while effectively preventing development of a yellowish color of the glass composition which is caused by $TiO_2$.

In order to attain the object described above, according to an aspect of the present invention, there is provided a method of producing a lead-free crystal glass composition which includes $SiO_2$, $TiO_2$ for increasing a refractive index and a dispersion of light, BaO for increasing a density and the refractive index and $K_2O$ for suppressing development of a color by Fe ions as principal components, comprising the step of adding, to a batch composition which is composed of 50 to 60 percent by weight of $SiO_2$, 4 to 14 percent by weight of $K_2O$, 10 to 20 percent by weight of BaO and 3 to 10 percent by weight of $TiO_2$, $NaNO_3$ (sodium nitrate) by 1.0 to 5.0 percent by weight or $BaO_2$ (barium peroxide) by 0.3 to 2.0 percent by weight for elimination of development of a color which arises from the 3 to 10 percent by weight of $TiO_2$ and one of $Sb_2O_3$ (antimony oxide) and $AS_2O_3$ (arsenious acid) by 0.2 to 1.0 percent by weight for defoaming.

Preferably, the batch composition includes CaO for compensating for a decrease in viscosity at a high temperature which arises from BaO, and the content of BaO and CaO is set to 10 to 20 percent by weight in a condition that the ratio BaO/CaO between BaO and CaO is BaO/CaO≧2.

In the method of the present invention, in order to suppress development of a yellow color by $TiO_2$, a raw material to which $NaNO_3$ or $BaO_2$ is added as an oxidizing agent and $Sb_2O_3$ or $As_2O_3$ is added as a defoaming agent is melted to produce glass. Each of the compounds is added by a suitable amount. In particular, since the content of $TiO_2$ in the batch composition is 3 to 10 percent by weight, where $NaNO_3$ is used as the oxidizing agent, it is added by 1.0 to 5.0 percent by weight, but where $BaO_2$ is used, it is added by 0.3 to 2.0 percent by weight. Where $Sb_2O_3$ is used as the defoaming agent, it is added by 0.2 to 1.0 percent by weight, and also where $AS2O_3$ is used, it is added by 0.2 to 1.0 percent by weight.

In glass such as lead-containing crystal glass, a combination of $NaNO_3$ with $Sb_2O_3$ or $AS_2O_3$ is conventionally used as a refining agent for improving defoaming of glass. By the inventors of the present invention, it has been found out that, while such combination exhibits an effect as a refining agent, oxygen which is generated at a high temperature acts as an oxidizing agent which oxidizes $TiO_2$ and thus suppresses development of a disagreeable yellow color. Mere use of a single compound of $Sb_2O_3$ or $As_2O_3$ or a single oxidizing agent such as $NaNO_3$ does not provide such effects as described above. Results of experiments conducted for confirmation of the effects were compared in light transmittance curves within the range of visible rays of light. The results are shown in FIG. 1. When glass absorbs light in a short wavelength region in the proximity of ultraviolet rays the glass looks yellowish. Although FIG. 1 illustrates only the results of experiments with $Sb_2O_3$, it has been confirmed that similar effects are exhibited also with $As_2O_3$.

The glass composition may be composed of, in addition to $SiO_2$, $K_2O$, BaO and $TiO_2$ as principal components, small amounts of $Li_2O$, $ZrO_2$ and $B_2O_3$. The contents of the components given above are listed up in Table 1 below. In Table 1, RO is a general representation of BaO and CaO, and $R_2O$ is a general representation of $Na_2O$, $K_2O$ and $Li_2O$. It is to be noted that representations of % in the following description are all represented in percent by weight.

TABLE 1

| Component | Content wt % |
|---|---|
| $SiO_2$ | 50.0–60.0 |
| RO | 10.0–20.0 |
| $R_2O$ | 10.0–20.0 |
| $TiO_2$ | 3.0–10.0 |
| ZnO | 5.0–15.0 |
| $ZrO_2$ | 0.0–2.0 |
| $B_2O_3$ | 0.0–2.0 |
| Oxidizing agent | |
| $NaNO_3$ | 1.0–5.0 |
| $BaO_2$ | 0.3–2.0 |
| Defoaming agent | |
| $Sb_2O_3$ | 0.2–1.0 |
| $As_2O_3$ | 0.2–1.0 |
| Oxidizing defoaming agent | |
| $NaSb(OH)_6$ | 0.5–2.0 |

In the production method for a glass composition of the present invention, $TiO_2$ and BaO are used as raw materials substituted for PbO and the refractive index and the dispersion value of light are increased by $TiO_2$ while the density and the refractive index are increased by BaO.

$TiO_2$ is effective to increase the refractive index and increase the dispersion value (decrease the Abbe number)

and is essential as a substitute for PbO in the present invention. Where $TiO_2$ is less than 3.0%, the target values of the refractive index and the dispersion value cannot be achieved. On the other hand, where $TiO_2$ exceeds 10.0%, the tendency that the color becomes yellowish increases significantly, and consequently, even if $NaNO_3$ or $BaO_2$ as an oxidizing agent which exhibits a color eliminating or decoloring effect and $Sb_2O_3$ or $As_2O_3$ as a defoaming agent are added, the tendency cannot be cancelled fully by the effects. This is not preferable with crystal glass with which importance is attached to the transparency.

If $SiO_2$ is less than 50.0%, then the glass composition is inferior in chemical durability, but if $SiO_2$ exceeds 60.0%, then it is necessary to raise the melting temperature of the glass composition and the density of the glass composition is decreased. While both of BaO and CaO can be employed as an alkali earth metal, the ratio of BaO must be high in order to assure a high density and a high refractive index. Where RO (BaO+CaO) is less than 10.0%, the target value of the density of 2.90% or more cannot be achieved. Where RO (BaO+CaO) exceeds 20.0%, although the viscosity of the glass composition at a high temperature decreases, the viscosity in a working range becomes high and the workability is deteriorated. Further, the corrosion to the furnace material is marked, and accordingly, it is difficult to melt the glass composition.

Alkali components $R_2O$ ($K_2O+Na_2O+Li_2O$) are used to lower the melting temperature. Where $R_2O$ exceeds 20%, although the melting property is improved, the chemical durability of the glass composition is degraded and the corrosion to the refractory is increased. $K_2O$ is effective and important to suppress development of a color of Fe ions which are an impurity in the glass. The content of $K_2O$ suitably ranges from 4 to 14%. $Na_2O$ is required in order to make up for the effect to lower the melting temperature. $Li_2O$ has a high effect to lower the melting temperature by addition of a small amount and is sufficient if it is contained by 1.0% or less also since it is expensive.

ZnO is effective to increase the chemical durability without increasing the hardness of the glass, moderate the viscosity-temperature curve and facilitate the forming workability. The amount of addition is sufficient within the range of 5.0% to 15.0%.

While both of $NaNO_3$ (sodium nitrate) or $BaO_2$ (barium peroxide) as an oxidizing agent and $Sb_2O_3$ (antimony oxide) or $As_2O_3$ (arsenious acid) as a defoaming agent are used, the reason why both of them are used is that it is effective to suppress development of a yellow color of $TiO_2$ as described hereinabove. $NaNO_3$ as an oxidizing agent does not exhibit the effect where the content of it is lower than 1.0%, but must be added by 1 to 5 percent. In order to maximize the color development suppression effect, it is effective to add $NaNO_3$ by approximately 4%. Where $BaO_2$ is used, it does not exhibit the effect if the content of it is lower than 0.3%. If the content exceeds 2.0%, then no better effect is exhibited. $Sb_2O_3$ or $As_2O_3$ as a defoaming agent exhibits no color development suppression effect and no defoaming effect where the content of it is lower than 0.2% Addition of it by 1.0% is sufficient. While a combination of $NaNO_3$ with $Sb_2O_3$ or $As_2O_3$ is conventionally used as a refining agent for improving defoaming of glass, in the present invention, in order to utilize oxygen generated at a high temperature as an oxidizing agent, the addition amount of the combination is larger than the amount of 0.05 to 0.5 percent (with respect to a batch composition) which is an amount of the combination which is added to ordinary glass. The addition ratio between the oxidizing agent and the defoaming agent is substantially determined from a reaction formula between them. The reaction formula is given below by way of an example of $NaNO_3$ and $AS_2O_3$.

In a low temperature region:

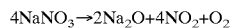

$4NaNO_3 \rightarrow 2Na_2O+4NO_2+O_2$

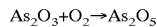

$As_2O_3+O_2 \rightarrow As_2O_5$

In a high temperature region:

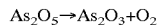

$As_2O_5 \rightarrow As_2O_3+O_2$

Accordingly, it is suitable to use $NaNO_3$ and $As_2O_3$ at the ratio of 4:1 in mole ratio.

Since the oxidizing agent and the defoaming agent are added in order to simultaneously achieve refining and suppression of development of a yellow color which arises from addition of $TiO_2$, the addition amounts of the oxidizing agent and the defoaming agent must be increased if $TiO_2$ increases. Although depending upon conditions of the atmosphere upon melting, the suitable addition amount of the defoaming agent is approximately 1/35 to 1/20 that of $TiO_2$ in mole ratio.

Since $B_2O_3$ is effective to lower the melting temperature without increasing the thermal expansion coefficient by addition of a small amount, it is added by 2.0% or less.

While $ZrO_2$ is added in order to raise the chemical durability, since it increases the hardness of the glass, it is not preferable with crystal glass, which is in most cases worked by cutting or polishing, and accordingly, the amount of addition of it must be restricted to the minimum.

According to another aspect of the present invention, there is provided a method of producing a lead-free crystal glass composition which includes $SiO_2$, $TiO_2$ for increasing a refractive index and a dispersion of light, BaO for increasing a density and the refractive index and $K_2O$ for suppressing development of a color by Fe ions as principal components, comprising the step of adding, to a batch composition which is composed of 50 to 60 percent by weight of $SiO_2$, 4 to 14 percent by weight of $K_2O$, 10 to 20 percent by weight of BaO and 3 to 10 percent by weight of $TiO_2$, $NaSb(OH)_6$ by 0.5 to 2.0 percent by weight for elimination of development of a color and defoaming which arise from the 3 to 10 percent by weight of $TiO_2$.

Also in this instance, preferably the batch composition includes CaO for compensating for a decrease in viscosity at a high temperature which arises from BaO, and the content of BaO and CaO is set to 10 to 20 percent by weight in a condition that the ratio BaO/CaO between BaO and CaO is $BaO/CaO \geq 2$.

$NaSb(OH)_6$ (sodium antimonate) added by 0.5 to 2.0 percent by weight as an additive which serves as an oxidizing agent and a defoaming agent reacts at a high temperature as given by

$2NaSb(OH)_6 \rightarrow Sb_2O_5+Na_2O+6H_2O$ and $Sb_2O_5$ (antimony pentoxide) further decomposes as given by

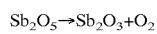

$Sb_2O_5 \rightarrow Sb_2O_3+O_2$

Here, $Sb_2O_3$ (antimony trioxide) exhibits a refining (defoaming) action while $O_2$ (oxygen) acts as an oxidizing agent upon bivalent iron and so forth and exhibits a decoloring action.

Since $NaSb(OH)_6$ (sodium antimonate) has both of refining (defoaming) and oxidizing actions in this manner, use of $NaSb(OH)_6$ eliminates the necessity for use of an oxidizing agent such as $Sb_2O_3$ (antimony trioxide) or $As_2O_3$ (arsenious acid). Further, use of $NaSb(OH)_6$ is advantageous also in that it little suffers from evaporation loss.

The suitable amount of $NaSb(OH)_6$ to be added (added amount to a batch with respect to glass 100) is 0.5 to 2.0 percent by weight. Where the added amount is smaller than 0.5%, so much foam is produced that defoaming cannot be performed sufficiently. However, if the amount of addition exceeds 2.0%, then although defoaming is performed sufficiently, since the amount of Sb is large, the glass product becomes yellowish.

The color tone of glass depends upon the amount of vitrified $Sb_2O_3$ rather than upon the added amount of $NaSb(OH)_6$ itself. As an example, the transmittance curve of glass to which $NaSb(OH)_6$ is added by 0.5% (0.3% as $Sb_2O_3$) is equal to the transmittance curve of glass to which $NaNO_3$ (sodium nitrate) is added by 1.5% and $Sb_2O_3$ (antimony trioxide) is added by 0.3%.

Due to such actions of the components as described above, a glass composition can be obtained which sufficiently satisfies such requirements for crystal glass that ① the density as physical data which represents a massiveness is 2.90 $g/cm^3$ or more;

② the refractive index Nd is 1.55 or more;

③ the Abbe number as physical data representative of dispersion is 47 or less;

④ the glass composition can be melted readily at a low temperature of 1,350 to 1,450° C.;

⑤ the thermal expansion coefficient can be made lower than $100 \times 10^{-7}/°C$. taking it into consideration that the glass composition is used frequently for tableware; and ⑥ the glass composition has a sufficient transparency as crystal glass.

It is to be noted that it is naturally possible to add a coloring agent such as chromium oxide by a small amount to produce colored crystal glass.

As described above according to the present invention, since $TiO_2$ is used as a raw material substituted for PbO and $NaNO_3$ or $BaO_2$ as an oxidizing agent and $Sb_2O_3$ or $As_2O_3$ as a defoaming agent are used and added individually by suitable amounts or else $NaSb(OH)_6$ (sodium antimonate) which serves both as an oxidizing agent and a defoaming agent is added in order to suppress development of a yellow color by $TiO_2$, crystalline glass which has a density, a refractive index and a dispersion value equal to or higher than those of conventional lead-containing crystal glasses can be obtained although it does not contain lead at all. Further, the raw materials are comparatively inexpensive and can be melted at a comparatively low temperature, and accordingly, the glass composition can be produced economically.

Where $NaSb(OH)_6$ (sodium antimonate) is added, since it has both of defoaming and oxidizing actions, the necessity for addition of another oxidizing agent such as $Sb_2O_3$ or $As_2O_3$ is eliminated. Further, $NaSb(OH)_6$ is advantageous also in that it little suffers from evaporation loss.

When it is considered that the regulations to lead are forecast to become progressively severe not only from the problem of dissolution from glassware but also to the operation environment and the environmental pollution caused by dust and fumes scattered at different steps from mixing of raw materials to a melting furnace, the advantage of the glass composition that lead which is very high in toxicity is not contained at all is very significant.

The above and other objects, features and advantages of the present invention will become apparent from the following description and the appended claims, taken in conjunction with the accompanying drawings in which like parts or elements are denoted by like reference characters.

DETAILED DESCRIPTION OF THE PREFERRED EMBODIMENTS

Figure 1:
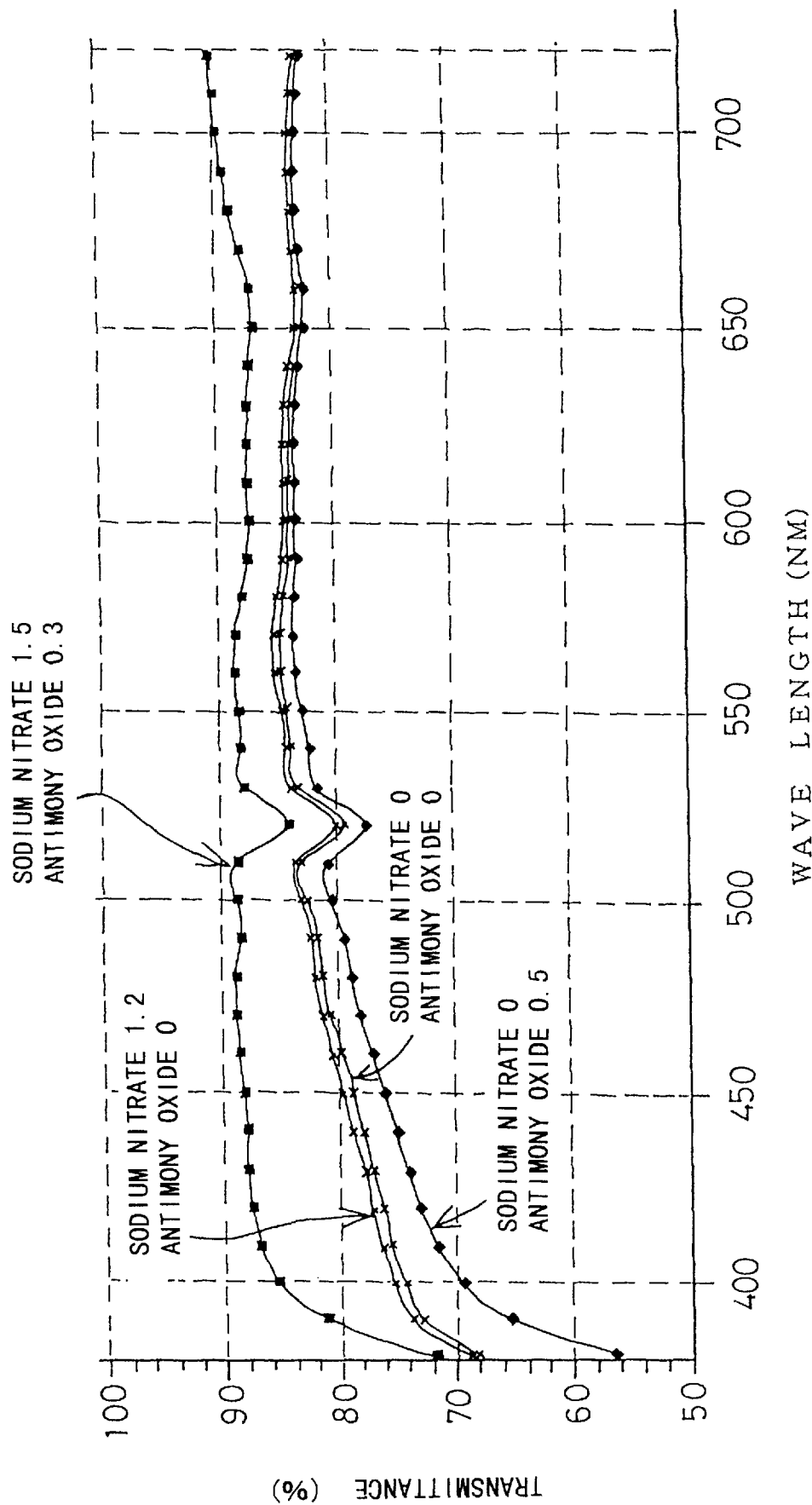
FIG. 1 is a diagram illustrating curves of transmittances of light where both, one and none of $NaNO_3$ (sodium nitrate) as an oxidizing agent and $Sb_2O_3$ (antimony oxide) as a defoaming agent are used.

Samples of Example 1 to Example 10 mixed so as to obtain such glass compositions as listed in Table 2 were individually put into platinum pots and melted for about 6 hours at the temperature of 1,375° C. in an electric furnace. Thereafter, the pots were taken out, and the molten glass materials were flown out onto a steel plate and then cooled gradually in a annealing furnace. Then, samples for measurement were cut away, and the density, the refractive index, the Abbe number and the thermal expansion coefficient of each of the samples were measured. Results of the measurements are listed in Table 2. In Table 2, Ex. 1 to Ex. 10 represent Example 1 to Example 10, respectively.

Also the color tones of the glass compositions obtained are recited in Table 2. Where both of the oxidizing agent and the defoaming agent are not included simultaneously like Example 1 to Example 3, the glass composition exhibits a disagreeable yellowish color (yellowish brown).

It is to be noted that conventional exemplary lead-containing crystal glass has a density of 2.95 to 3.00 $g/cm^3$, a refractive index Nd of 1.555 to 1.565, an Abbe number of 45 to 47 and a thermal expansion coefficient of 96 to $100 \times 10^{-7}/°C$.

TABLE 2

| Components & Physical Data | Ex. 1 | Ex. 2 | Ex. 3 | Ex. 4 | Ex. 5 |
|---|---|---|---|---|---|
| $SiO_2$ | 54.95 | 54.6 | 51.15 | 50.1 | 55.5 |
| CaO | 4 | 3.5 | 5 | 3 | 1.5 |
| BaO | 12 | 12.5 | 14 | 14.5 | 13 |
| $Na_2O$ | 3 | 3.5 | 3 | 3 | 6 |
| $K_2O$ | 9 | 10 | 11 | 12.5 | 7 |
| $Li_2O$ | 0.5 | 0.5 | 0.5 | 0.5 | |
| $TiO_2$ | 7.5 | 7 | 5 | 7 | 6.5 |
| ZnO | 7.5 | 8 | 7.5 | 7 | 9 |
| $ZrO_2$ | | 1 | 1 | 1 | |
| $B_2O_3$ | 1.25 | 1 | 1.5 | 1 | 1 |
| $Sb_2O_3$ | | 0.5 | | 0.65 | 0.5 |
| $AS_2O_3$ | | | | | |
| $NaNO_3$ *1 | | | 1.5 | 1.5 | |
| $BaO_2$ *1 | | | | | 1 |
| $NaSb(OH)_6$ *1 | | | | | |
| Density ($g/cm^3$) | 2.885 | 2.908 | 2.951 | 2.955 | 2.902 |
| Refractive Index Nd | 1.589 | 1.59 | 1.588 | 1.601 | 1.582 |
| Abbe Number | 46.5 | 46.8 | 48.2 | 46.5 | 47 |
| Coefficient *2 ($\times 10^{-7}/°$ C.) | 92.6 | 97 | 101.4 | 105.5 | 94.3 |
| Color tone *3 | y.b | y.b | y.b | good | good |

| Components & Physical Data | Ex. 6 | Ex. 7 | Ex. 8 | Ex. 9 | Ex. 10 |
|---|---|---|---|---|---|
| $SiO_2$ | 55.2 | 55 | 52 | 52 | 52 |
| CaO | 1.5 | 4.8 | 5 | | 2 |
| BaO | 13.3 | 14 | 10.5 | 12 | 13 |
| $Na_2O$ | 9.5 | 6.5 | 4 | 6 | 6 |
| $K_2O$ | 5 | 4.5 | 10 | 11 | 8 |

TABLE 2-continued

| | | | | | |
|---|---|---|---|---|---|
| $Li_2O$ | | | | | |
| $TiO_2$ | 5 | 7.5 | 8 | 9 | 7.5 |
| ZnO | 9 | 6 | 8 | 8 | 9 |
| $ZrO_2$ | | | | | |
| $B_2O_3$ | 1 | 1 | 2 | 1.6 | 2 |
| $Sb_2O_3$ | 0.5 | | 0.8 | | 0.5 |
| $As_2O_3$ | | 0.5 | | 0.8 | |
| $NaNO_3$ *1 | | 2.5 | 4.5 | | |
| $BaO_2$ *1 | 0.5 | | | 3 | |
| $NaSb(OH)_6$ *1 | | | | | 0.85 |
| Density (g/cm³) | 2.906 | 2.917 | 2.907 | 2.906 | 2.944 |
| Refractive Index Nd | 1.577 | 1.586 | 1.595 | 1.591 | 1.591 |
| Abbe Number | 47 | 46.4 | 45.6 | 44.5 | 46 |
| Coefficient *2 (× $10^{-7}$/°C.) | 99.5 | 92 | 97 | 104.9 | 98.1 |
| Color tone *3 | good | good | good | good | good |

*1: The amount of $NaNO_3$, $BaO_2$ or $NaSb(OH)_6$ represents an amount of addition to a batch with respect to the glass amount 100. As glass components, they are included in $Na_2O$, BaO, and $Na_2O$ and $Sb_2O_3$, respectively.
*2: Coefficient: thermal expansion coefficient.
*3: The color tone represents that of the glass composition. The term 'y.b' in the row of the color tone is an abbreviation of 'yellowish brown'.

Having now fully described the invention, it will be apparent to one of ordinary skill in the art that many changes and modifications can be made thereto without departing from the spirit and scope of the invention as set forth herein.

What is claimed is:

1. A method of producing a lead-free crystal glass composition which includes $Si_2$, $TiO_2$ for increasing a refractive index and a dispersion of light, BaO for increasing a density and the refractive index and $K_2O$ for suppressing development of a color by Fe ions as principal components, comprising the step of:

adding, to a batch composition which is composed of 50 to 60 percent by weight of $SiO_2$, 4 to 14 percent by weight of $K_2O$, 10 to 20 percent by weight of BaO and 3 to 10 percent by weight of $TiO_2$, a combination of $NaNO_3$ by 1.0 to 5.0 percent by weight and one of $Sb_2O3$ and $As_2O_3$ by 0.2 to 1.0 percent by weight for elimination of development of a color which arises from the 3 to 10 percent by weight of $TiO_2$.

2. A method of producing a lead-free crystal glass composition which includes $SiO_2$, $TiO_2$ for increasing a refractive index and a dispersion of light, BaO for increasing a density and the refractive index and $K_2O$ for suppressing development of a color by Fe ions as principal components, comprising the step of:

adding, to a batch composition which is composed of 50 to 60 percent by weight of $SiO_2$, 4 to 14 percent by weight of $K_2O$, 10 to 20 percent by weight of BaO and 3 to 10 percent by weight of $TiO_2$, a combination of $BaO_2$ by 0.3 to 2.0 percent by weight and one of $Sb_2O_3$ and $As_2O_3$ by 0.2 to 1.0 percent by weight for elimination of development of a color which arises from the 3 to 10 percent by weight of $TiO_2$.

3. A method of producing a lead-free crystal glass composition as claimed in claim 1, wherein the batch composition includes CaO for compensating for a decrease in viscosity at a high temperature which arises from BaO, and the content of BaO and CaO is set to 10 to 20 percent by weight in a condition that the ratio BaO/CaO between BaO and CaO is BaO/CaO ≧ 2.

4. A method of producing a lead-free crystal glass composition as claimed in claim 2, wherein the batch composition includes CaO for compensating for a decrease in viscosity at a high temperature which arises from BaO, and the content of BaO and CaO is set to 10 to 20 percent by weight in a condition that the ratio BaO/CaO between BaO and CaO is BaO/CaO ≧ 2.

* * * * *

UNITED STATES PATENT AND TRADEMARK OFFICE
CERTIFICATE OF CORRECTION

PATENT NO. : 5,897,678
DATED : April 27, 1999
INVENTOR(S) : Hidetoshi KOMIYA et al It is certified that error appears in the above-identified patent and that said Letters Patent is hereby corrected as shown below:

In column 7, at line 29, change "$Si_2$" to --$SiO_2$--.

Signed and Sealed this

Thirty-first Day of August, 1999

Attest:

Q. TODD DICKINSON

*Attesting Officer*    *Acting Commissioner of Patents and Trademarks*